Sept. 5, 1939.   J. T. WARREN   2,172,116
AUTOMATIC SAFETY DEVICE FOR VEHICLES
Filed July 6, 1937   2 Sheets-Sheet 1
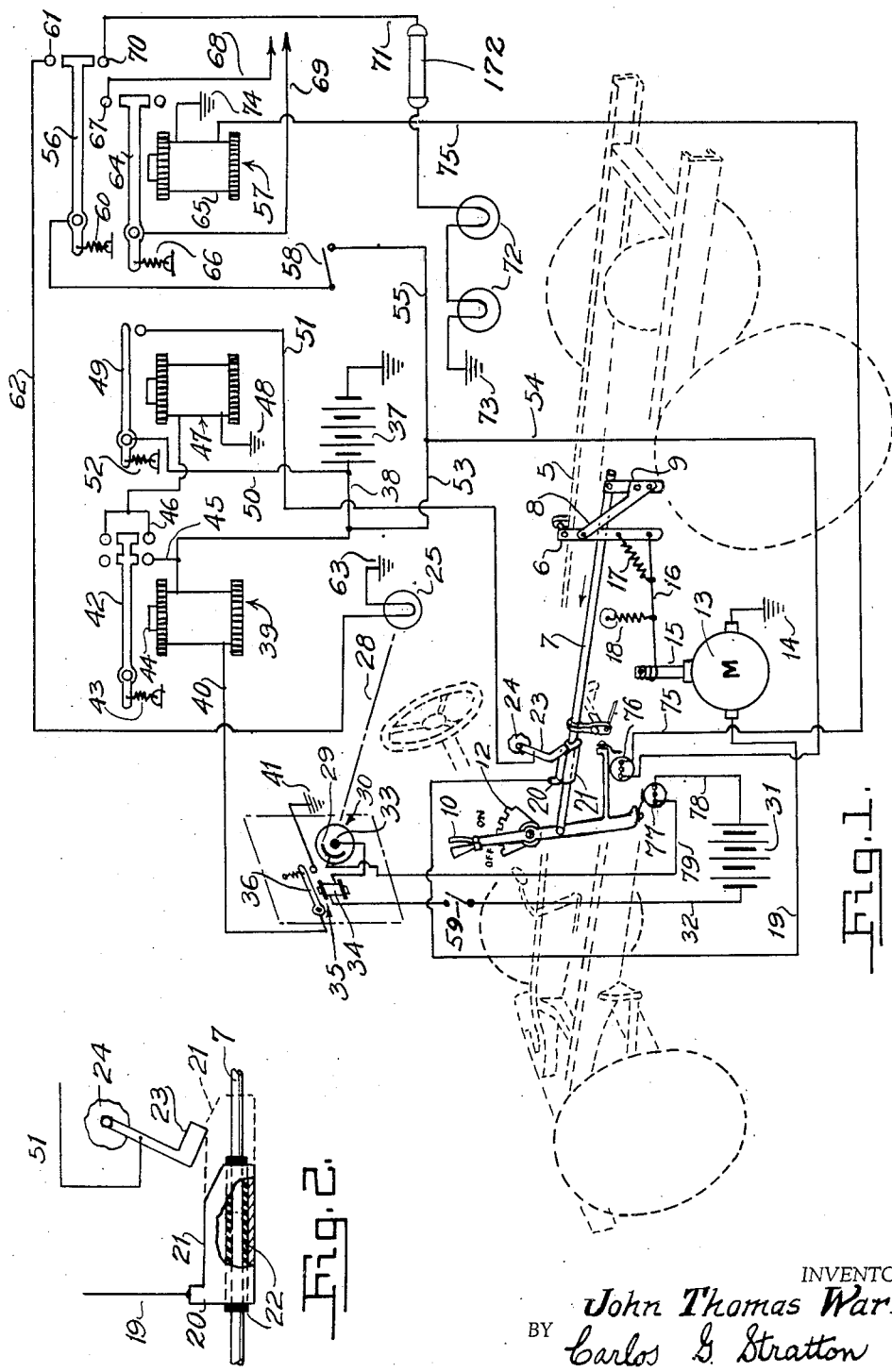
INVENTOR.
John Thomas Warren
BY Carlos G. Stratton
ATTORNEY.

Sept. 5, 1939.   J. T. WARREN   2,172,116
AUTOMATIC SAFETY DEVICE FOR VEHICLES
Filed July 6, 1937   2 Sheets-Sheet 2
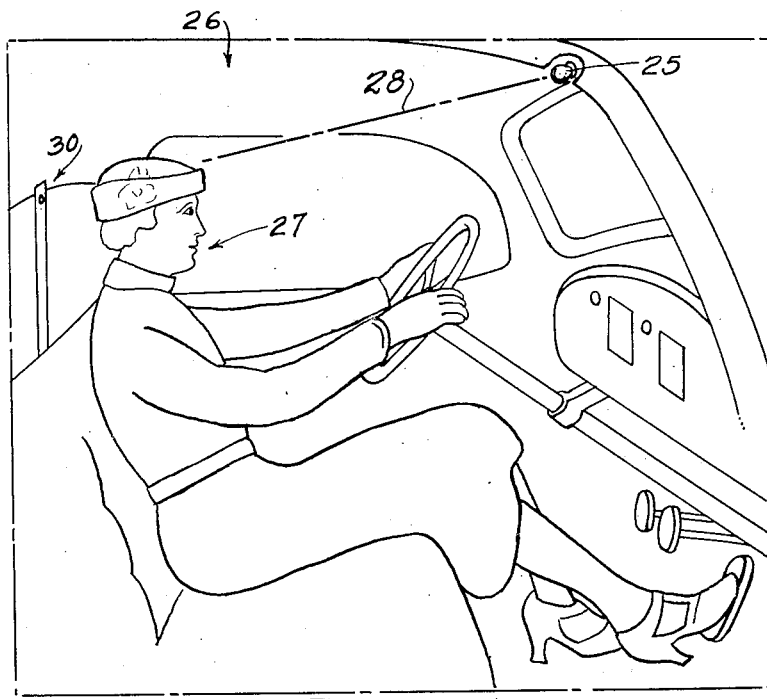
Fig. 3.
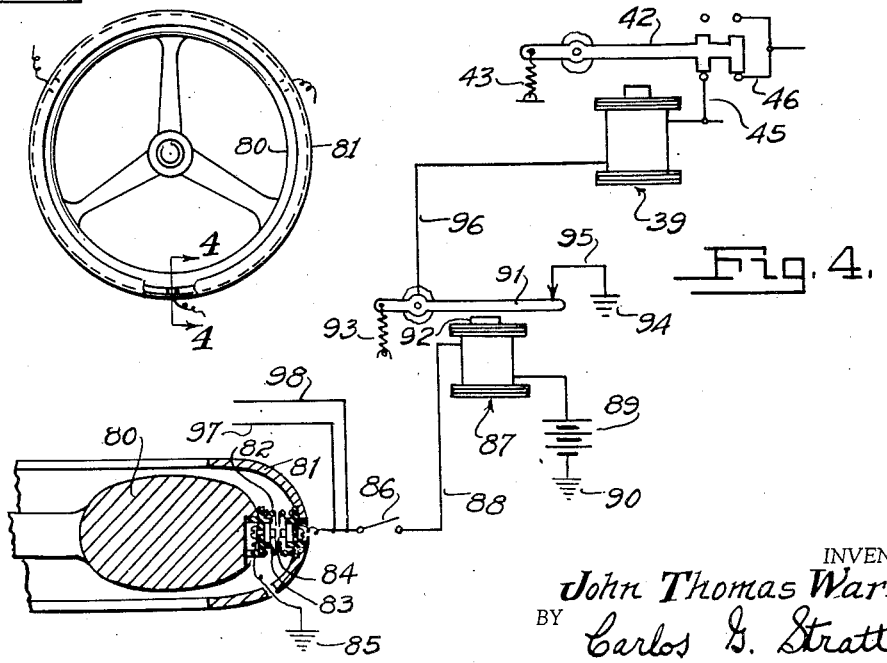
Fig. 5.
Fig. 4.
INVENTOR.
John Thomas Warren
BY Carlos G. Stratton
ATTORNEY.

Patented Sept. 5, 1939

2,172,116

UNITED STATES PATENT OFFICE 2,172,116

AUTOMATIC SAFETY DEVICE FOR VEHICLES

John Thomas Warren, Los Angeles, Calif.

Application July 6, 1937, Serial No. 152,021

13 Claims. (Cl. 188—110)

My invention relates to automatic safety devices for vehicles. An important object of my invention is to provide means for automatically turning off the engine and applying the brakes of a vehicle, particularly an automotive vehicle, such as a passenger automobile or truck, when the driver has collapsed because of heart attack, epilepsy, intoxication, sleepiness, or has gotten out of driving position by accident, carelessness, or for any other cause.

Another object is to provide means for automatically signaling when a driver has for the foregoing, or any other reason, moved from the usual driving position.

Still another object is to provide automatic means for stopping a vehicle when the driver collapses, even though he does not move out of the ordinary driving position.

The invention also comprises novel details of construction and novel combinations and arrangement of parts, which will more fully appear in the course of the following description.

In the drawings, like reference characters designate similar parts in the several views.

Figure 1 is a diagrammatic view of wiring circuits comprised in the invention, applied to the chassis of an automotive vehicle.

Figure 2 is a broken elevation, enlarging a detail.

Figure 3 is a perspective view of a driver's compartment of an automobile, illustrating an embodiment of my invention.

Figure 4 is a broken section of a steering wheel, taken on the line 4—4 of Figure 5, together with a wiring diagram illustrating another feature of my invention.

Figure 5 is a plan of a steering wheel, with a part broken away.

Referring more in detail to the drawings, the reference numeral 5 generally designates the frame of an automobile chassis. Pivotally mounted on the frame 5 is a depending bar 6. The bar 6 is connected to a brake rod 7 through the intermediary of a link 8 which pivotally connects the bar 6 with an arm 9 that is fixed on the brake rod 7.

The brake rod 7 connects with the brakes in a conventional manner at one end and at the other end connects with a brake lever 10. A rack 12 is engaged by a pawl (not shown) on the lever, to hold the lever 10 in desired positions. The pawl is so arranged that the lever 10 is permitted to move to an "on" position without removal of the pawl. Moving the lever 10 from the "on" position requires manual release of the pawl. Such description is believed sufficient for one skilled in the art.

Automatically the brakes connected with the rod 7 are applied, and the brake lever 10 is moved to an "on" position by an electric motor 13, which is grounded at 14 on the frame of the vehicle. A spool 15 driven by the motor winds up a cable 16 when the motor is actuated. The cable is connected with the depending arm 6. Springs 17 and 18 resist the winding of the cable on the spool 15, and unwind the cable therefrom when the circuit of the motor 13 is broken.

A wire 19 connects the motor 13 with a lug 20 on a contact 21. Said contact is mounted on the rod 7 but insulated therefrom, as suggested at 22. A contact 23 is in engagement with the contact 22 when the lever 10 is locked in the "off" position. The full line position of the contact 21, in Figure 2, is its position when the lever 10 is in the "on" position, and the broken line position of the contact 21 is its position when the lever 10 is in the "off" position. The contact 23 is fixed on the vehicle; the fragment of the vehicle to which the contact 23 is attached (and from which it is insulated) is shown at 24.

An ultra red ray lamp 25 is disposed opposite the normal position of a driver in the driving compartment 26 of a motor vehicle. The driver 27 normally intercepts beam 28 of the lamp 25.

When, however the driver collapses and slumps down in his seat for any reason, the beam 28 impinges upon the inner concave surface of the cathode 29 of the photoelectric cell 30, which surface is sensitive to light. The light beam 28 causes said inner surface to emit electrons. A battery 31, by means of a wire 32, places a positive potential on the anode 33 of the cell, attracting the electrons and completing the circuit.

When the photoelectric cell 30 completes the circuit, an electromagnet 34 in a relay 35 is energized, attracting its armature 36, which closes another circuit leading from a battery 37, through wire 38, through a relay 39, wire 40, through the armature 36 and to a ground 41.

Closing of this latter circuit through the movement of the armature 36 energizes the relay 39, which thereby attracts its armature 42. A spring 43 urges the armature 42 away from core 44 of the relay 39, when the latter is deenergized.

Attraction of the armature 42 causes it to connect wires 45 and 46, which connects the source 37 (through wires 38 and 45) with another relay 47, which is grounded at 48. Energization of the relay 47 attracts its armature 49, which in turn connects the source 37, through wire 50, to a wire 55

51, which is connected with the contact 23. The armature 49 has a spring 52 to move it away from the electromagnet of the relay 47, when same is deenergized, thus breaking the last described circuit.

Another wire 53 connects with the source 37. This wire has two branches 54 and 55. The branch 55 connects with an armature 56 of a double pole, double throw relay 57. A manual switch 58 is arranged in the wire 55, and a manual switch 59 is arranged in the wire 32.

A spring 60 urges the armature 56 (when the relay 57 is deenergized) into engagement with contact 61 at the end of a wire 62 which connects with the ray lamp 25. The lamp is grounded at 63.

The second armature 64 is also attracted by the electromagnet 65 of the relay 57, when same is energized. A spring 66 urges the armature 64 into engagement with a contact 67 when the relay 57 is deenergized.

The contact 67 is at the end of a wire 68, which together with wire 69 complete the ignition circuit of the motor of the vehicle. Wire 69 is connected with the armature 64.

When the relay 57 is energized (in a manner to be described), both armatures 56 and 64 are attracted. When so attracted, armature 56 breaks the circuit of the lamp 25 and engages a contact 70 at the end of a wire 71. Wire 71 is connected with a plurality of red blinker lights 72 in series. The lights 72 are grounded at 73. It is to be understood that means 172 for flashing the lights 72 on and off is connected in the line 71.

When the armature 64 is attracted by the electromagnet 65, the circuit of the ignition system of the motor is broken, thus shutting off the motor.

The relay 57 is grounded at 74 and connected by a wire 75 with a switch 76 of suitable construction, e. g., a snap switch. The other wire leading to the switch 76 is branch wire 54 of wire 53.

A second switch 77 is connected to the source 31 by a wire 78 and to the cathode 29 of the photoelectric cell 30. This switch may also be a snap switch.

The two switches 76 and 77 are operated mechanically by the brake lever 10. In the position shown in Figure 1, with the lever 10 in the "off" position, the switch 76 has been moved to an open position and the switch 77 has been moved to a closed position. When the lever 10 is in the "on" position, the switch 76 is moved to a closed position and the switch 77 to an open position.

The feature shown in Figures 4 and 5 comprises a steering wheel 80 around which is mounted an annular rim 81 that is channel shaped in cross section. A plurality of coiled springs 82 are mounted between the wheel and the rim. Disposed between the rim and the wheel are contacts 83 and 84 which are separated when the springs 82 hold the wheel and rim apart. The contact 83 is grounded at 85, while the contact 84 is connected with a manual switch 86, which in turn is connected to a relay 87 by a wire 88. The relay is connected with a battery 89, which is grounded at 90.

Armature 91 of the relay 87 is urged away from the core 92 of the relay by a spring 93. Under action of the spring, the armature 91 completes a circuit to a ground 94 through a wire 95. The armature 91 is connected to the relay 39, hereinbefore described, by a wire 96, whereby the steering wheel mechanism may be connected to control the present invention.

In the use of the invention, after the driver assumes a driving position, the manual switches 58, 59 and 86 are closed. The light beam 28 is broken by the driver's body. The driver's grip on the steering wheel closes one or more pairs of contacts 83, 84. The latter pairs of contacts are spaced around the steering wheel and connected in parallel by wires 97 and 98, so that contact by any pair of said contacts will close the circuit of the wire 88.

By said means, if the driver has a heart attack, an attack of epilepsy, is intoxicated or sleepy, or for any other reason either moves out of the path of the beam 28, or loses his grip on the steering wheel, the present mechanism is operated.

In any of such emergencies, the ignition of the motor is turned off, the red blinker lights 72 are flashed on and off and the brakes are applied, all automatically.

Considering the beam of light first, the operation is as follows: When the system is rendered operative by closing of said manual switches, shining of the beam of light upon the photoelectric cell closes the circuit of the relay 35 which in turn closes the circuit of the relay 39. The relay 39 thereupon closes the circuit of the relay 47, which starts the motor 13. The motor 13, when actuated, winds up the cable 16. This applies the brakes through movement of the brake rod 7. The brakes are locked in their applied position by the pawl on the lever 10 engaging the ratchet 12, until manually released by some person.

Movement of the lever 10 to an "on" position breaks the circuit of the ray lamp 25 by the following mechanism: The switch 76 closes, thus energizing the coil 65, whose core attracts the armature 56, thus breaking the connection with the wire 62 leading to the ray lamp.

Energization of the coil 65 also attracts the armature 64, which by movement breaks the connection with the wire 68, thus breaking the circuit of the ignition system of the motor, and hence stopping the engine.

By attraction of the armature 56, it not only turns off the ray lamp 25 but also completes the circuit of the red blinker lights 72, through the wire 71, which flash on and off, attracting the attention of passing motorists or other persons. The blinker lights are in any desired position on the vehicle; it is, however, recommended that at least one of them be at the rear of the vehicle.

The manual switches 58, 59 and 86 are in positions convenient to the driver, such as on the dashboard of the vehicle.

Movement of the contact 21 with the brake rod 7 separates said contact from the fixed contact 23. The circuit of the motor 13 is thus broken when the brakes have been applied. Movement of the brake lever 10 to its "on" position opens the switch 77, thus breaking the circuit of the relay 35. When the relay 35 is deenergized, the spring urged armature 36 is withdrawn from the core of the coil 34, thus breaking the circuit of the relay 39.

Deenergization of the relay 39 permits the armature 42 to move to a position in which the source is disconnected from the relay 47, thus deenergizing same. The relay 47, when deenergized breaks the circuit leading to the fixed contact 23.

Releasing the grip on the steering wheel permits the springs 82 to separate the contacts 83 and 84, which deenergizes the relay 87, allowing the spring urged armature 91 to complete the circuit of the relay 39, thus actuating the entire system. This mechanism is another arrangement for energizing the relay 39.

The steering wheel control may be used as an alternative to the photoelectric cell and ray lamp. The selection of which control to use is made by the driver turning off manually the control not desired.

It is believed clear without further illustration that instead of operating the brake rod 7 of a mechanical brake, the present system may be employed to operate air brakes and/or a vacuum booster, such as on a truck and trailer. In the latter connection, the valve controlling same would be operated by my system. The present system may also be employed to operate the master cylinder of a hydraulic brake system.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

It is to be understood that an amplifying tube may be used in the circuit of the photoelectric cell 30, to amplify the current therefrom.

Having thus described my invention, what I claim and desire to secure by Letters Patent is:

1. In combination, the braking system of an automotive vehicle, motor means to actuate said braking system, a normally open electric circuit controlling said motor means, a photoelectric cell controlling said circuit, and a ray lamp which together with the light sensitive member of the photoelectric cell are arranged at either side of a driver of the vehicle, whereby the driver's person normally intercepts the beam from the lamp to said cell, the cell being connected to close the circuit, when the beam is not so intercepted.

2. In combination, the braking system of an automotive vehicle, motor means to actuate said braking system, a normally open electric circuit controlling said motor means, a motor for the vehicle, a circuit for the latter motor, a ray lamp arranged at one side of the normal position of a driver of the vehicle, a photoelectric cell arranged at the opposite side of the driver's normal position, to receive a beam of light from the ray lamp when the beam is not intercepted by the person of the driver, and mechanism arranged to be actuated when the first-mentioned circuit is closed, to open the circuit for the vehicle motor, the cell being connected to close the first-mentioned circuit and thereby apply the brakes, when struck by the beam of light.

3. In combination, the braking system of an automotive vehicle, motor means to actuate said braking system, a normally open circuit controlling said motor means, a ray lamp arranged at one side of the normal position of a driver of the vehicle, a photoelectric cell arranged at the opposite side of the driver's normal position, to receive a beam of light from the ray lamp, when the beam is not intercepted by the person of the driver, the cell being connected to close the circuit and thereby apply the brakes, when struck by the beam of light, and circuit-breaking means for the circuit connected to be operated by the braking means after the brakes are applied.

4. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, an electric relay connected to close said circuit when energized, the photoelectric cell being connected to energize the relay when the cell is struck by said beam, contacts in the circuit normally in engagement, and mechanical means to separate the contacts when the brakes are applied.

5. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, an electric relay connected to close said circuit when energized, the photoelectric cell being connected to energize the relay when the cell is struck by said beam, a motor for the vehicle, a circuit for the latter motor, a relay connected to open the latter circuit when energized, a circuit for the latter relay, contact means in first and last mentioned circuits, and mechanical means to separate the contacts in the first-mentioned circuit and close the contacts in the last mentioned circuit when the brakes are applied.

6. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, a circuit for the lamp, the cell being connected to close the circuit when energized by a beam from the lamp and to break the circuit when such a beam is not shining on it, and mechanism connected to break the circuit of the lamp when the brakes are applied.

7. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, a circuit for the lamp, the cell being connected to close the circuit when energized by a beam from the lamp and to break the circuit when such a beam is not shining on it, a relay controlling the circuit for the lamp, a circuit for the relay, switch means in the relay circuit, and mechanical means controlling said switch means, actuated upon application of the brakes.

8. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, a circuit for the cell, means in the latter circuit to close the first-mentioned circuit when the cell is energized by a beam of light from the lamp, and mechanism connected to break the circuit for the cell when the brakes are applied.

9. In combination, the braking system of an automotive vehicle, motor means to actuate said braking system, a normally open circuit controlling said motor means, a ray lamp and a photoelectric cell arranged at opposite sides of the normal position of a driver of the vehicle, whereby the driver's person normally intercepts the beam from the lamp to the cell, a circuit for the cell, a relay in the latter circuit arranged to close the motor circuit when the cell is energized by a beam of light from the lamp and thereby closes the cell circuit, energizing the relay, a switch in the cell circuit, and mechanism to open the switch upon application of the brakes.

10. In combination, the braking system of an automotive vehicle, motor means to actuate said braking system, a circuit controlling said motor means, a ray lamp and a photoelectric cell arranged at opposite sides of the normal position of a driver of the vehicle, whereby the driver's person normally intercepts the beam from the lamp to the cell, a blinker light for the vehicle, separate circuits for the lamp and for the blinker light, a relay having an armature movable to close one or the other of the latter circuits, depending upon whether the relay is energized or deenergized, the cell being connected to close the motor circuit when energized by a beam from the lamp and to break the motor circuit when such beam is not shining on it, the armature being arranged to break the ray lamp circuit and to close the blinker light circuit when the brakes are applied.

11. In combination, the braking system of an automotive vehicle, motor means to actuate said braking system, a circuit controlling said motor means, a ray lamp and a photoelectric cell arranged at opposite sides of the normal position of a driver of the vehicle, whereby the driver's person normally intercepts the beam from the lamp to the cell, a blinker light for the vehicle, a source of electric energy, means normally connecting the ray lamp with said source and arranged to disconnect the ray lamp from the source and to connect the blinker light with the source when the brakes are applied, the cell being connected to close the motor circuit when energized by a beam from the ray lamp and to break the motor circuit when such beam is not shining on it.

12. In combination, the braking system of an automotive vehicle, motor means to actuate said braking system, a normally open circuit controlling said motor means, mechanism, responsive to involuntary and abnormal movement of a part of the driver's person, arranged to close the circuit, and circuit-breaking means for the circuit, the latter means being rendered operative upon application of the brakes, and means operatively associated with a part of the vehicle necessarily manipulated in the course of setting the vehicle in motion for resetting said circuit breaking means.

13. In combination, the braking system of an automotive vehicle, motor means to actuate said braking system, a normally open circuit controlling said motor means, mechanism, responsive to involuntary and abnormal movement of a part of the driver's person, arranged to close the circuit, contacts in the circuit in contact with each other when the brakes are not applied, and means to mechanically separate the contacts upon movement of the brake applying means.

JOHN THOMAS WARREN.